United States Patent
Chee

Patent Number: 5,694,141
Date of Patent: Dec. 2, 1997

[54] COMPUTER SYSTEM WITH DOUBLE SIMULTANEOUS DISPLAYS SHOWING DIFFERING DISPLAY IMAGES

[75] Inventor: Lawrence Chee, Vancouver, Canada

[73] Assignee: Seiko Epson Corporation, Tokyo, Japan

[21] Appl. No.: 486,796

[22] Filed: Jun. 7, 1995

[51] Int. Cl.$^6$ ............................................. G09G 5/00
[52] U.S. Cl. ........................ 345/1; 345/3; 345/153; 345/154
[58] Field of Search ......................... 345/3, 155, 2, 345/1, 154, 153

[56] References Cited

U.S. PATENT DOCUMENTS

| | | |
|---|---|---|
| 4,751,502 | 6/1988 | Ishii et al. . |
| 4,760,387 | 7/1988 | Ishii et al. . |
| 4,980,678 | 12/1990 | Zenda . |
| 5,124,688 | 6/1992 | Rumball ........................ 345/154 |
| 5,138,305 | 8/1992 | Tomiyasu . |
| 5,150,109 | 9/1992 | Berry . |
| 5,222,212 | 6/1993 | Johary et al. . |
| 5,293,474 | 3/1994 | Patil et al. . |
| 5,293,485 | 3/1994 | Zenda . |
| 5,327,156 | 7/1994 | Masukane et al. . |
| 5,479,184 | 12/1995 | Tokumitsu ........................ 345/3 |
| 5,488,385 | 1/1996 | Singhal et al. ..................... 345/3 |

FOREIGN PATENT DOCUMENTS

| | | |
|---|---|---|
| 0 579 402 | 1/1994 | European Pat. Off. . |
| 0 601 535 | 6/1994 | European Pat. Off. . |
| 44 04 437 | 8/1994 | Germany . |
| 92/03816 | 3/1992 | WIPO . |

*Primary Examiner*—Richard Hjerpe
*Assistant Examiner*—Juliana S. Kim
*Attorney, Agent, or Firm*—Mark P. Watson

[57] ABSTRACT

A computer system includes a pair of display devices, such as cathode ray tubes (CRT's) or liquid crystal displays (LCD's) for providing a visible display to a user of the computer system. The computer system includes a video display controller (VDC) providing for simultaneous display of different images on the pair of display devices. The VDC includes a display data processing circuit (DDPC) which is variably configurable to provide decoding of data words from a first bit-word format as received from a display first-in-first-out (FIFO) memory to a second bit-word format as required by a particular one of the pair of display devices. The DDPC is variably configurable to allow the pair of display devices to each receive driving signals providing the simultaneous differing images, and which driving signals originate with the bit-words allocated to each particular one of the pair of display devices. Accordingly, the DDPC simultaneously decodes bit-words from the first bit-word format to a pair of second bit-word formats, which second bit-word formats need not be the same, but can differ depending on the type of display device receiving the corresponding driving signals.

27 Claims, 9 Drawing Sheets

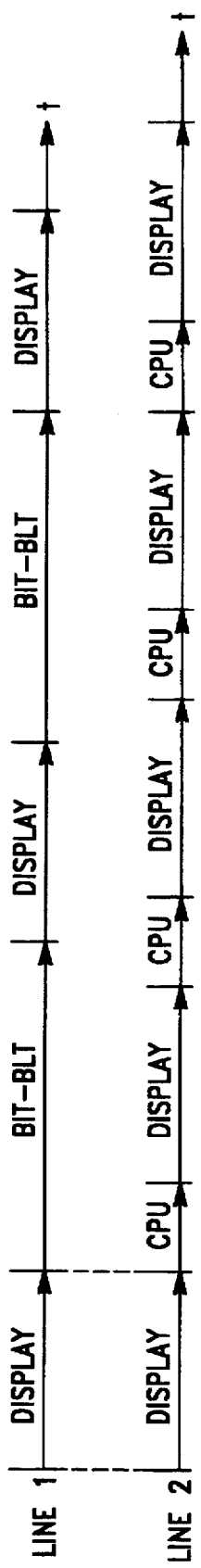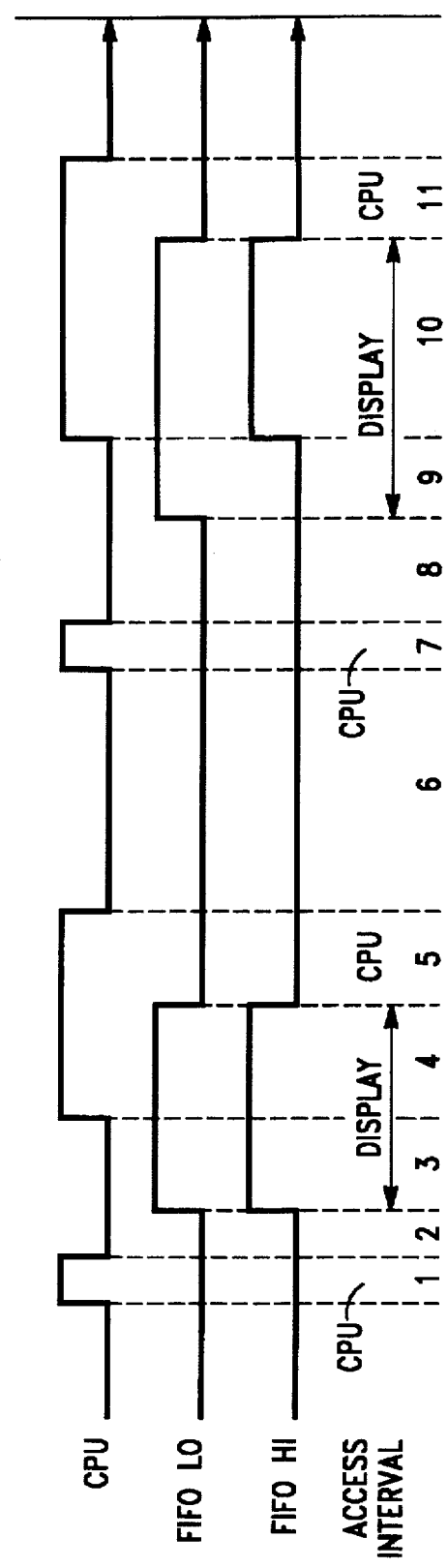

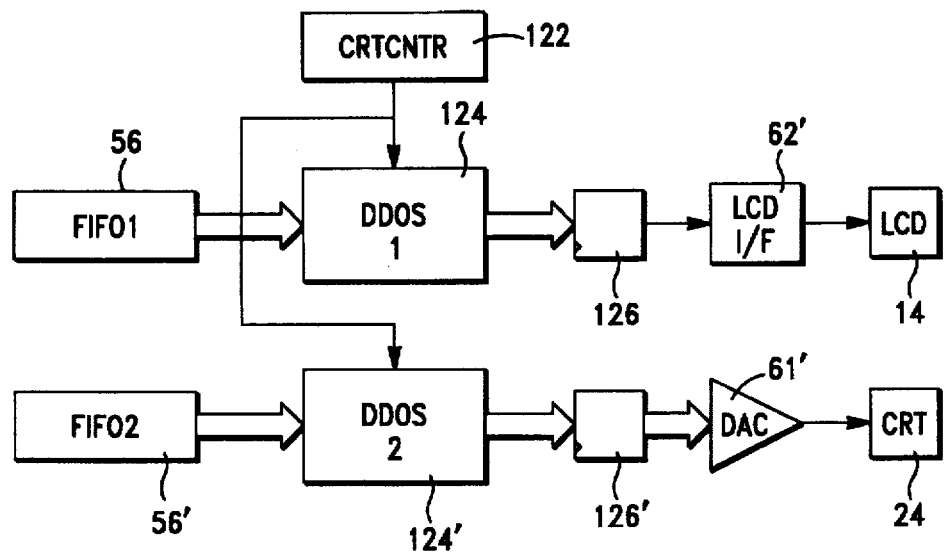
FIG.—15
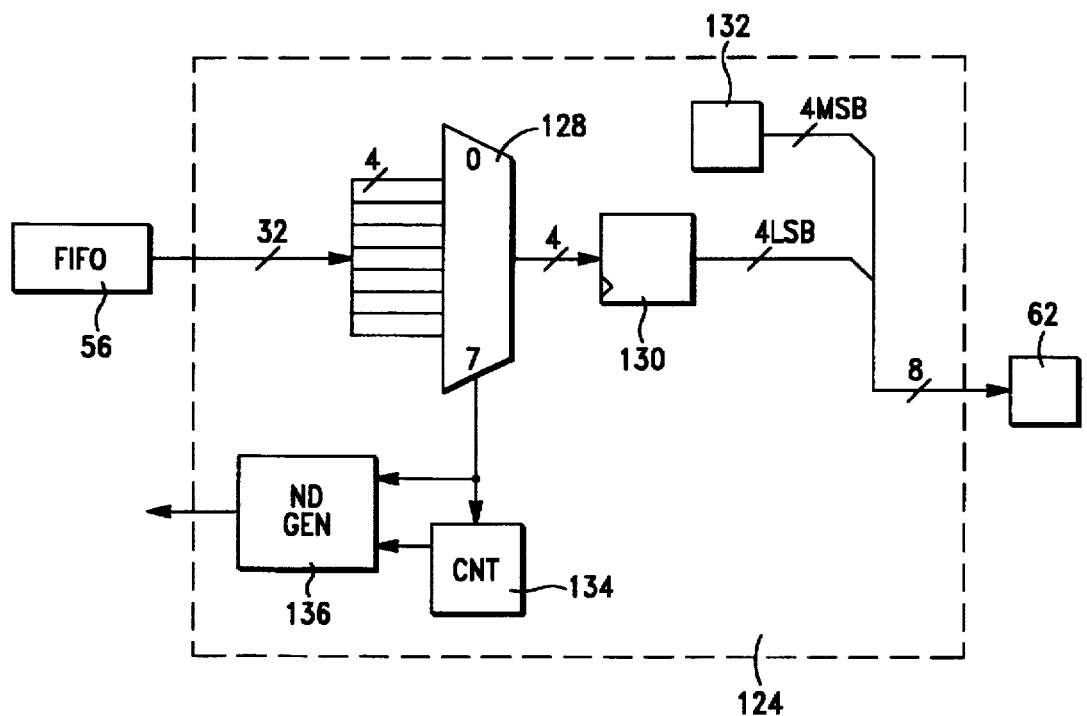
FIG.—16

COMPUTER SYSTEM WITH DOUBLE SIMULTANEOUS DISPLAYS SHOWING DIFFERING DISPLAY IMAGES

CROSS REFERENCE TO RELATED APPLICATIONS

The subject matter of the present application is related to subject matter disclosed in U.S. patent application Ser. No. 08/487,121, entitled "Computer System with Video Display Controller having Power Saving Modes", and to application Ser. No. 08/487,117, entitled "Computer System with Display", to application Ser. No. 08/485,876, entitled, "Display FIFO Module Including a Mechanism for Issuing and Removing Requests for DRAM Access", and to application Ser. No. 08/487,120, entitled, "Computer System with Dual-Panel LCD Color Display", all filed on the same day and assigned to the same assignee as the present application.

BACKGROUND OF THE INVENTION

1. Field of the Invention

The present invention relates generally to a computer system with double display devices, such as one or two cathode ray tubes (CRT), or one or two liquid crystal displays (LCD), or a mix of one CRT and a LCD, for example. The double display devices provide a user of the computer system with a visible display of computer data, such as text or graphics. The double display devices may each display differing imagery for the computer user. More particularly, the present invention is in the field of a computer system having a graphics generator, and a video display controller (VDC) for such a computer system. Via a bus interface, the VDC receives image information, such as text or graphics generated by a processor (CPU) or retrieved by the CPU from another facility (such as a CD-ROM) of the computer system, and provides signals driving double display devices, such two CRT's or LCD's, or a CRT and a LCD.

2. Related Technology

A conventional bus arbitrating circuit is known in accord with U.S. Pat. No. 4,453,214 (hereinafter, the '214 patent), issued 5 Jun. 1984 to Ralph L. Adcock. According to the '214 patent, a bus arbitrator and memory manager (BAMM) establishes a priority among competing operating units of a computer system. The BAMM sorts requests for access to the memory according to a priority, and allows the device with the highest priority access ahead of the other devices. It appears that once a device is allowed access to the memory, an interrupt of this access is not allowed when a request for access from another device with a higher priority is received by the BAMM of the '214 patent. When a device which has had memory access is finished with this access, it provides a "sign off" signal, thus allowing the BAMM to permit memory access to the device requesting access and having the highest priority.

With a BAMM of the type disclosed by the '214 patent, a display FIFO of a computer system could conceivably be denied access to the DRAM at a time when a display FIFO is nearly or completely out of information for display. Thus, continuity of operation of the display of the computer system could be interrupted. Understandably, this type of display interrupt would be disconcerting and confusing for a user of the computer system.

Another conventional graphics system with a graphics controller and DRAM controller is known in accord with U.S. Pat. No. 4,991,112 (hereinafter, the '112 patent), issued 5 Feb. 1991 to Jean-Michel Callemyn. According to the '112 patent, a DRAM controller receives refresh requests and requests for access to the DRAM in bursts, and arbitrates among the requests. During a display stage, after a preparatory read, the greatest priority is given to the display FIFO. A read of the DRAM in bursts may be interrupted when the FIFO is full. In this case, priority is given to a possible preparatory read. In the absence of a preparatory read request, a request by the CPU will be honored and access to the DRAM will be effected for the CPU. As soon as the FIFO makes a request for access, however, the CPU access will be interrupted, and the previously interrupted read in bursts for the FIFO with be resumed. During the line return stage, differing priorities are set for access to the DRAM. That is, refreshing the DRAM is given highest priority, followed by filling of the display FIFO. Third in priority is compliance with access requests from the graphics processor, and then assesses for the CPU. However, other than the interrupt described above, the '112 patent is not believed to allow interruption of an access to the DRAM once this access is allowed. Additionally, the interrupt allowed by the '112 patent is an inherent interrupt necessary to prevent data of the FIFO from being overwritten by new data because the FIFO is full.

Yet another conventional DRAM refresh controller with a bus arbitration scheme is known in accord with U.S. Pat. No. 5,345,577 (hereinafter, the '577 patent), issued 6 Sep. 1994, to Tzoyao Chan and Milton Cheung. According to the '577 patent, a cache controller is provided with both burst and hidden refresh modes. Refresh requests are counted but not acted upon by allowing memory access until a certain number of these requests are received. On the other hand, hidden refreshes are done with no hold signal being sent to the CPU while the refresh is done. Until the refresh is completed local memory access but not remote memory access is allowed. Consequently, the CPU is denied memory access during a hidden refresh, but will not expect immediate access to the memory anyway so that the hidden refresh does not interfere with CPU operation. Interruption of memory access once granted does not appear to be a feature of this patent.

Taking general considerations into account, in a graphics controller, such as a VDC generally described above, arbitrating DRAM interface (access) among the several devices of the system is the most critical portion of the controller. Access to the DRAM dictates how and when devices such as the bit-BLT engine, display FIFO, and the local bus (that is, the CPU) have access to the DRAM. Access requests by the CPU and bit-BLT engine are mutually exclusive, and will not occur simultaneously. Ordinarily, whenever access to the DRAM is discontinued for one device and allowed for another device, a new page of the DRAM must be accessed. That is, the DRAM may be visualized as a two-dimensional array of memory locations. This memory uses rows and columns of memory locations (or memory cells) with a row pointer and a column pointer. As long as memory access is made to a single row of the memory, with the column pointer simply moving along the row as data is written to or read from address locations of the row, then a single-page access to the memory is effected, and no page break is necessary. However, when another row (i.e., another page) of the memory must be accessed, a pre-charge sequence must be run in preparation to accessing the next row of memory locations. This pre-charge sequence takes time so that a multiple-page access to the memory is not nearly as efficient as a single-page access in terms of the amount of data written into or read from the memory during the time interval of such a memory access.

Thus, page-mode access to the DRAM is much more efficient in terms of time utilization than is random access to the DRAM because of the many page breaks required for random access. When page-mode is not maintained for the DRAM, then at least one preparatory pre-charge cycle must be conducted to allow access to another different page of the DRAM in addition to the time interval required to write the data to or read the data from the memory cells. When access is allowed to the DRAM for the bit-BLT, these accesses will ordinarily be multi-page accesses which consume considerable time, but a request for this access does not require that immediate access to the DRAM be granted. On the other hand, CPU (local bus) access to the DRAM is usually a single-page access, requires considerably less time than a bit-BLT access, and also does not require that a request result in immediate access. However, when the CPU is required to wait for DRAM access, the system throughput is decreased and the WINMARKS (industry standard performance bench marks) for the computer system also are decreased. Further, the display FIFO of a graphics controller also requests DRAM access, and may be envisioned as a storage tank of water (data) draining at a uniform rate from the bottom, and only occasionally being refilled from the top. The display FIFO stores image information to be sent to the display devices (i.e., to the CRT or LCD, for example). The rate of drainage of the data from the display FIFO depends on the mode of display operation. If the display is being operated in a grey-scale mode which requires four bits per pixel, then the display FIFO will not drain very fast. On the other hand, if the user is operating the display in a color mode, then each pixel of the display may require eight bits, or sixteen bits, or possibly more than sixteen bits of information; and the display FIFO will drain correspondingly faster.

When being refilled, the refilling rate of the display FIFO is much higher than the draining rate. But, refilling may be intermittent and interrupted for the allowance of other activities requiring access to the DRAM. Further, it must be understood that while the FIFO is being refilled, complete double-words of data must be input from the DRAM. If there is insufficient room at the top of the display FIFO to accept all of the last complete double-word of data being input at a particular time, then some of the existing data will be overwritten and lost. Conventionally, a FIFOLO request (a low priority request for DRAM access) is issued by the display FIFO to the DRAM controller as soon as the display FIFO has room at the top for at least one double-word of new data without overwriting existing data waiting to be sent to the display device.

Consequently, one or more accesses to the DRAM may be granted to the display FIFO in response to the FIFOLO request. This request is not cleared until the FIFO is filled. If the display FIFO is not adequately refilled in response to the FIFOLO request, then as soon as the display FIFO starts to write its last double-word of data to the display a FIFOHI request for access to the DRAM will be issued. This FIFOHI request will be honored immediately. Again, the FIFOHI request will not be cleared until the FIFO is filled completely. Consequently, a conventional DRAM controller will clear both FIFOLO and FIFOHI simultaneously after a FIFOHI request has been issued. Again, these requests for DRAM access would conventionally not be cleared until the FIFO is completely filled with fresh data.

FIG. 1, line 1, depicts a timing diagram showing an idealized sequence of accesses to a DRAM of a VDC alternating between a display FIFO and a bit-BLT engine. Line 2 of this FIG. 1 also shows an idealized sequence of accesses to the DRAM by a display FIFO and the CPU. These idealized timing diagrams show that neither the bit-BLT or CPU is required to wait for DRAM access, that the DRAM has no idle time, and that the accesses granted are relatively long for the bit-BLT so that multi-page accesses can be accomplished. Conventional computer system graphics controllers do not achieve such idealized management of DRAM access.

Moreover, in an actual computer system graphics controller (i.e., a VDC), the sequencing of the requests for access to the DRAM and the accesses to the DRAM actually granted are not idealized. Accordingly, hypothetical FIG. 2 (designated as prior art) depicts a timing diagram as might be experienced in an actual conventional computer system graphics controller. Viewing FIG. 2, the first of the three time lines of this graph respectively shows requests for access to the DRAM from the CPU. The next two lines show access requests from the display FIFO: first on a low priority basis (FIFOLO)—indicating that the display FIFO is sufficiently depleted of display information that at least one double-word of new information can be written to this FIFO without overwriting existing data; and secondly, on a high priority basis (FIFOHI)—indicating that the display FIFO is using its last double-word of information and is at risk of running out of information to be provided to the user by means of the display device (i.e., the CRT or LCD, for example). These FIFOLO and FIFOHI requests are not cleared (i.e., removed or discontinued) until the display FIFO is granted DRAM access and the FIFO is completely filled with data. In this conventional graphics controller, access to the DRAM at the highest priority is allowed to a display FIFOHI request, even interrupting an access already granted to the CPU or to another device of the computer system.

Considering FIG. 2, during interval #1, the CPU is granted DRAM access and signs off. During interval #2, the DRAM is idle. The beginning of interval #3 indicates the start up of the display graphics process with the display FIFO empty, and the simultaneous issuance of a FIFOLO and FIFOHI request. The FIFOHI request is honored, but these requests (FIFOLO and FIFOHI) are not cleared until the display FIFO is completely filled with data. As a result, the beginning of interval #4 indicates a request from the CPU for DRAM access which will not be honored until the FIFOHI request is cleared. Interval #4 indicates waiting time for the CPU. The end of interval #4 indicates the simultaneous clearing of both FIFOLO and FIFOHI, and the beginning of interval #5 during which the CPU is finally granted DRAM access. Interval #9 indicates the issuance of a FIFOLO request from the display FIFO for DRAM access. Because insufficient data is provided to the display FIFO in response to the FIFOLO request (another device, such as the bit-BLT, for example, may be making DRAM access so that the FIFOLO request in not sufficiently honored), the display FIFO issues a FIFOHI request at the beginning of interval #10. This FIFOHI request is honored immediately during interval #10. However, another interval (interval #10) results during which the CPU is denied access to the DRAM. At the end of interval #10 the FIFOLO and FIFOHI requests are both cleared simultaneously, and the CPU is granted DRAM access.

Moreover, FIG. 2 shows that the conventional arbitration scheme results in the DRAM sometimes being idle (intervals 2, 6, and 8), and in either the CPU or display FIFO waiting for access to the DRAM (intervals 4, 9, and 10). Once a FIFOHI request is made, the CPU is be required to wait until the display FIFO is completely filled before access to the DRAM can be granted to the CPU, even though the display FIFO may have received enough data that there in no longer an immediate risk of its running out of data for the displays. This conventional graphics controller both fails to maintain page mode for the DRAM, and also decreases the throughput rate for the computer system.

Accordingly, a long-felt need has been recognized for a more efficient and effective way of arbitrating access to the DRAM of a graphics controller.

Further, a conventional display controller is known in accord with U.S. Pat. No. 5,138,305 (hereinafter, the '305 patent), issued 11 Aug. 1992 to Yuichi Tomiyasu. It is believed that the '305 patent teaches a display controller which will drive a LCD using VGA format signals intended for a CRT. The '305 patent does not appear to relate to simultaneously driving double displays, each with a different image.

Another conventional VGA controller card is known in accord with U.S. Pat. No. 5,150,109 (hereinafter, the '109 patent), issued 22 Sep. 1992 to Wayne F. Berry. The '109 patent is believed to disclose a bus-mountable VGA controller card for IBM compatible computers, which will allow driving of a LCD, or of a CRT, or of the LCD and CRT simultaneously. However, both display devices will show the same image. The '109 patent is not believed to relate to the driving of two display devices simultaneously, with each display device showing a different image.

Still another conventional system for raster imaging with automatic centering and image compression is known in accord with U.S. Pat. No. 5,293,474 (hereinafter, the '474 patent), issued 8 Mar. 1994 to Subas S. Patil, et. al. The '474 patent is believed to relate to a video display control system in which horizontal or vertical centering, or both, of an image as presented on a display, as well as image compression to fit a display size, without using a memory frame buffer. The '474 patent is not believed to relate to driving double displays simultaneously, with each display having a different image.

SUMMARY OF THE INVENTION

In view of the deficiencies of the conventional technology, an object for this invention is to provide a computer system with a graphics controller avoiding one or more of these deficiencies.

Another object for this invention is to provide such a computer system with a video display controller (VDC) receiving image information, such as text or graphics, and providing signals driving a display.

Yet more particularly, the present invention has as an object the provision of a VDC having a sequencer and controller (SEQC) arbitrating access to a dynamic random access memory (DRAM) of the VDC among a CPU, a video memory of the first-in-first-out (FIFO) type, a bit-BLT, and other devices of the computer system.

Still another object for this invention is to provide a video display controller allowing two displays to be driven simultaneously, with each display having a different image.

Accordingly, the present invention provides a computer system with a graphics controller (i.e., a video display controller) having a sequencer-controller (SEQC) implementing a two-tiered sequence of priorities among requests for access to a DRAM of the VDC, with each request in the upper tier being allowed to effect an interrupt of any lower-priority access to the DRAM, and requests in the lower tier not being allowed to effect such an interrupt. Interrupted accesses and requests awaiting access to the DRAM are placed in a queue according to the priority they enjoy in the two-tiered priority scheme. A result is that the sequence and logic of the priorities assigned to requests for access to the DRAM by the various devices of the computer system, along with the enabling or denial of interrupting access to the DRAM by other devices of the computer system, causes the DRAM to be accessed more effectively. Under some operating conditions, those access to the DRAM which need to be relatively long multi-page accesses will be implemented in this way; while under other operating conditions, the accesses will be briefer accesses always insuring that priority requests to the DRAM are implemented in a timely manner. That is, requests for accesses by a display FIFO on a high priority basis and for drawing a mouse image, for example, will always be allowed immediate access to the DRAM. The display access requests and the mouse image requests never occur simultaneously.

The present invention also provides a computer system with a video display controller having a plurality (at least two) of display FIFO's, and a display pipeline which is variably configurable to allow the display FIFO's to input display data for at least two displays which are to be driven simultaneously, with each display providing a different image.

According to another aspect, the present invention provides a computer system including an input device for receiving inputs from a user of the computer system; a central processing unit (CPU) interfacing with the input device and responding to the inputs by performing a processing function producing an output including display data; a memory device interfacing with the CPU to provide memory storage of commands and data used by the CPU; an output device receiving the output response from the CPU and providing a sensible output response; the output device including a display device providing a visible image to the user in response to the display data; a video display controller (VDC) including a graphics generator (GG) interfacing with the processor and with the output device to provide additional display data providing portions of the visible image; a dynamic random access memory (DRAM) interfacing with the CPU via the VDC and receiving the display data including the additional display data for temporary storage, the DRAM also interfacing with the CPU and the GG to provide temporary storage of data used in the processing function and in the providing of the additional data; the VDC including a display first-in-first-out (FIFO) memory interfacing with the DRAM for receiving and temporarily holding display data including the additional display data to be imminently presented on the display device, the display FIFO being of certain capacity and continuously providing the data to the display device while receiving data from the DRAM only intermittently, the display FIFO issuing a request for access to the DRAM on a low priority basis (FIFOLO) or on a high priority basis (FIFOHI) dependent respectively on whether a data level in the display FIFO is below a FIFOLO pointer or is below a (FIFOHI) pointer; each of the CPU and the GG also issuing respective requests for access to the DRAM; and a sequencer and controller unit (SEQC) arbitrating access to the DRAM among the CPU, the GG, and the display FIFO according to a multi-tiered priority for access to the DRAM, the multi-tiered priority ranking requests within each tier according to priority and including a lower-tier and a tier above the lower tier, with lower-tier requests not being enabled to interrupt any existing DRAM access, and with requests in a tier above the lower tier being enabled to interrupt an existing DRAM access granted by the SEQC in response either to a request of that tier having a lower rank or to a lower-tier request.

According to a still additional aspect, the present invention provides a system including an input device for receiving inputs from a user of said system; a central processing unit (CPU) interfacing with said input device and responding to said inputs by performing a processing function producing an output including display data; an output device receiving said output response from said CPU and providing a sensible output response; said output device including at least a pair of display devices each providing a different visible image to the user in response to said display data; a video display controller (VDC) including a display data processing circuit (DDPC); a dynamic random access memory (DRAM) interfacing with said CPU via said VDC and receiving said display data including said additional display data for temporary storage; said VDC including at least a pair of display first-in-first-out (FIFO) memories interfacing with said DRAM for receiving and temporarily holding display data including said additional display data to be imminently presented on a corresponding one of said at least a pair of display devices, said at least a pair of display FIFO's also interfacing with said DDPC to provide thereto corresponding data destined for each particular one of said at least a pair of display devices, said DDPC including plural display data decode and over scan (DDOS) portions each corresponding to one of said at least a pair of display FIFO's and receiving said display data therefrom, each of said plural DDOS portions providing a corresponding de-multiplexer circuit receiving said display data in a first bit-word format and responsively providing a data bit stream in a selected second bit-word format to the corresponding one of said at least a pair of display devices.

Additional objects and advantages of the present invention will be apparent from a reading of the following detailed description of particular preferred embodiments of the present invention, taken in conjunction with the appended drawing Figures, in which like reference numeral indicate the same feature, or features which are analogous in structure or function.

BRIEF DESCRIPTION OF THE DRAWING FIGURES

FIG. 1 provides a graphical representation of idealized accesses to a dynamic random access memory by a bit block transfer (bit-BLT) engine and by a central processing unit (CPU).

FIG. 2 presents a hypothetical timing diagram which may be experienced in a prior art computer system having a conventional graphics controller.

FIG. 3 provides a pictorial presentation of a computer system, including a notebook type computer having a LCD display to display a first image, and also a television which being used as a display device for the computer system 10 to display a different second image;

FIG. 4 is a schematic functional block diagram of the computer system seen in FIG. 1;

FIG. 5 provides a schematic functional block diagram of the video display controller (VDC) of the computer system seen in the preceding figures;

Figures 8, 9, 10:
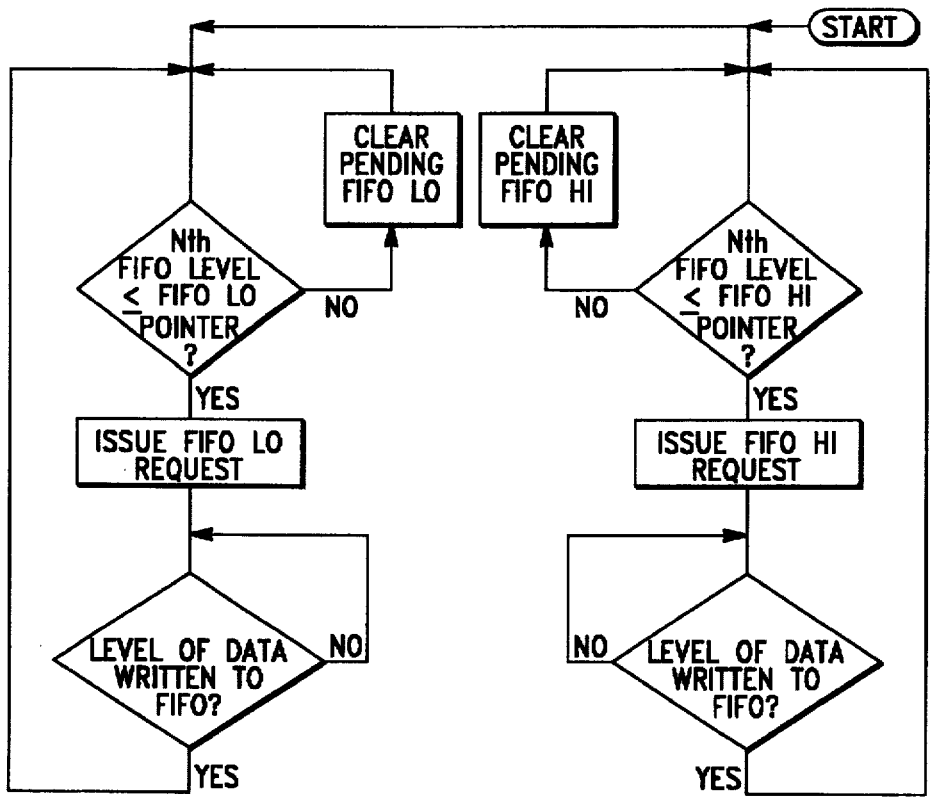
Figure 11:
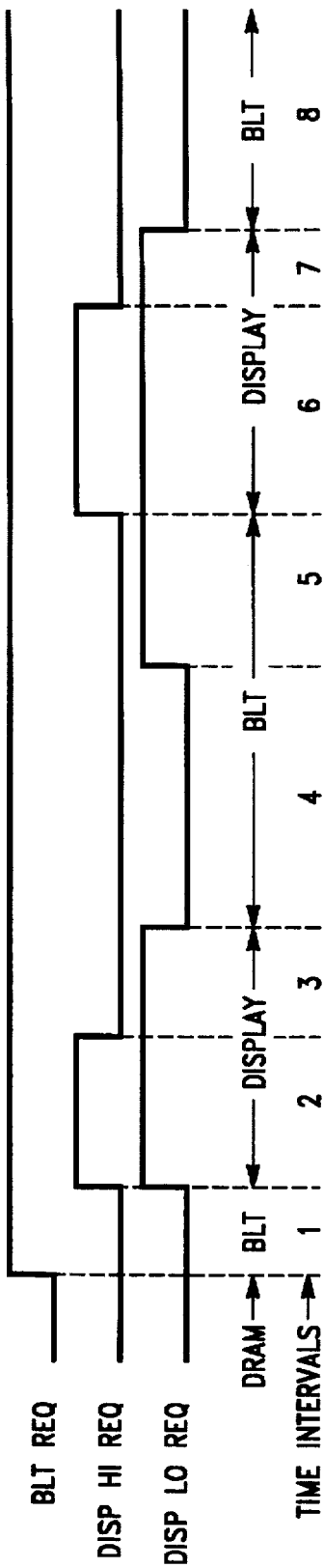
Figure 12:
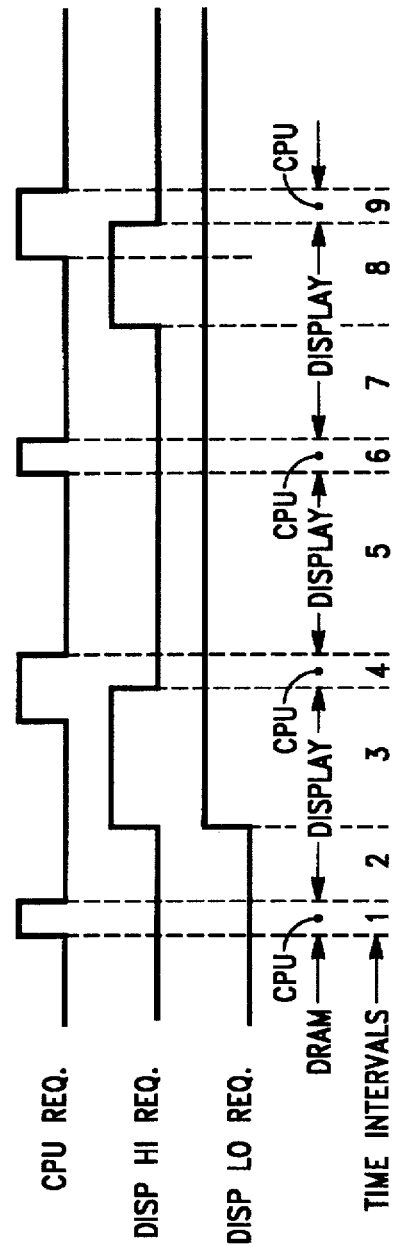
Figure 13:
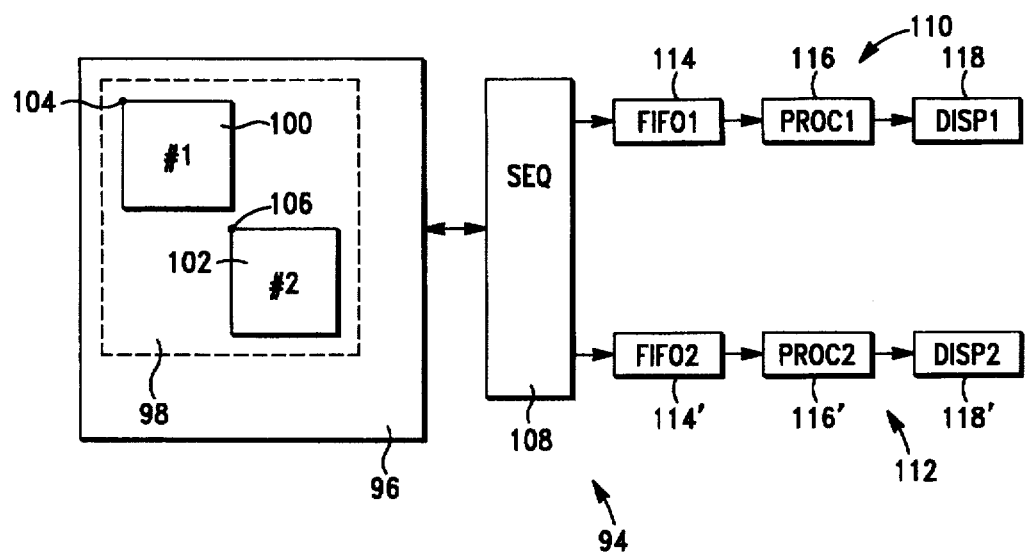
Figure 14:
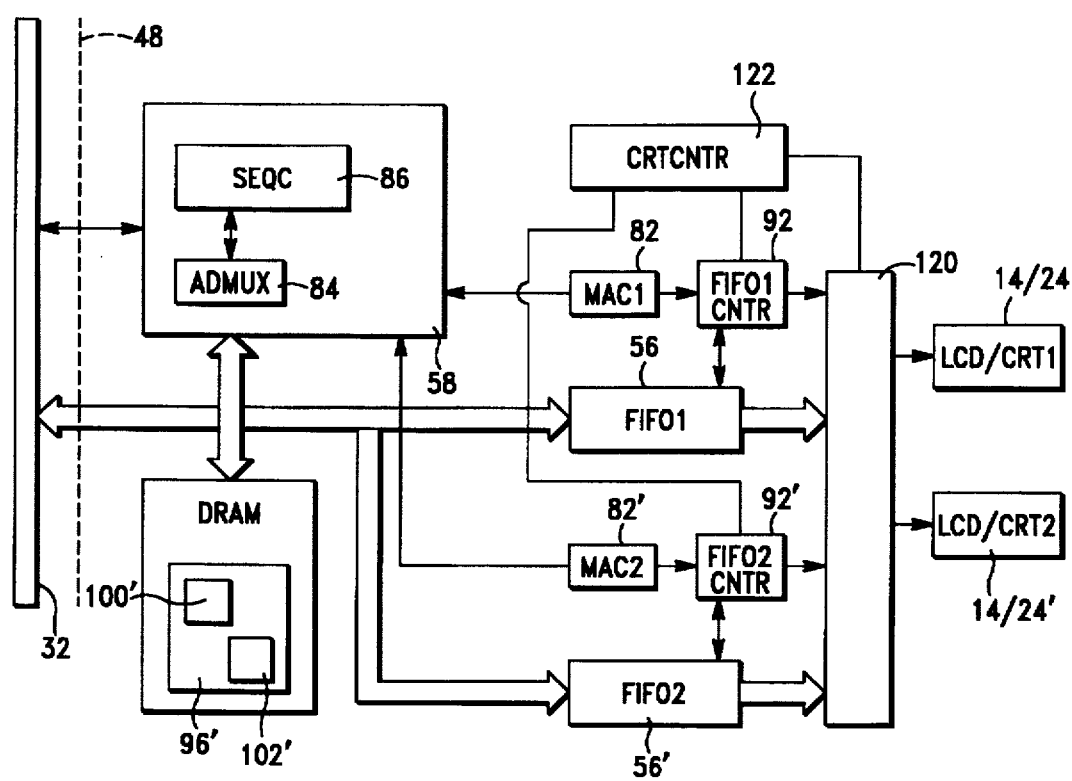
Figure 17:
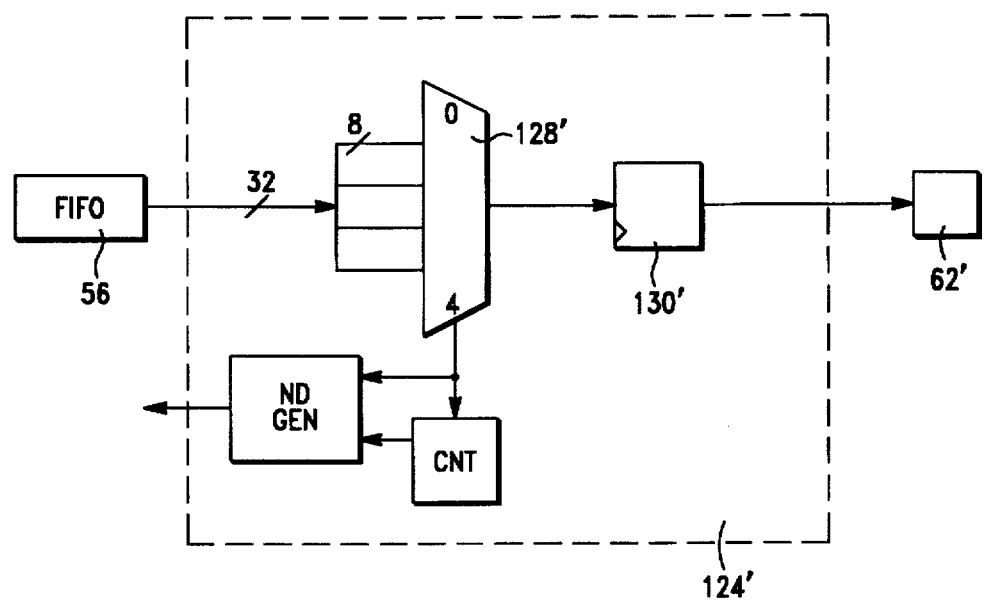
Figure 18:
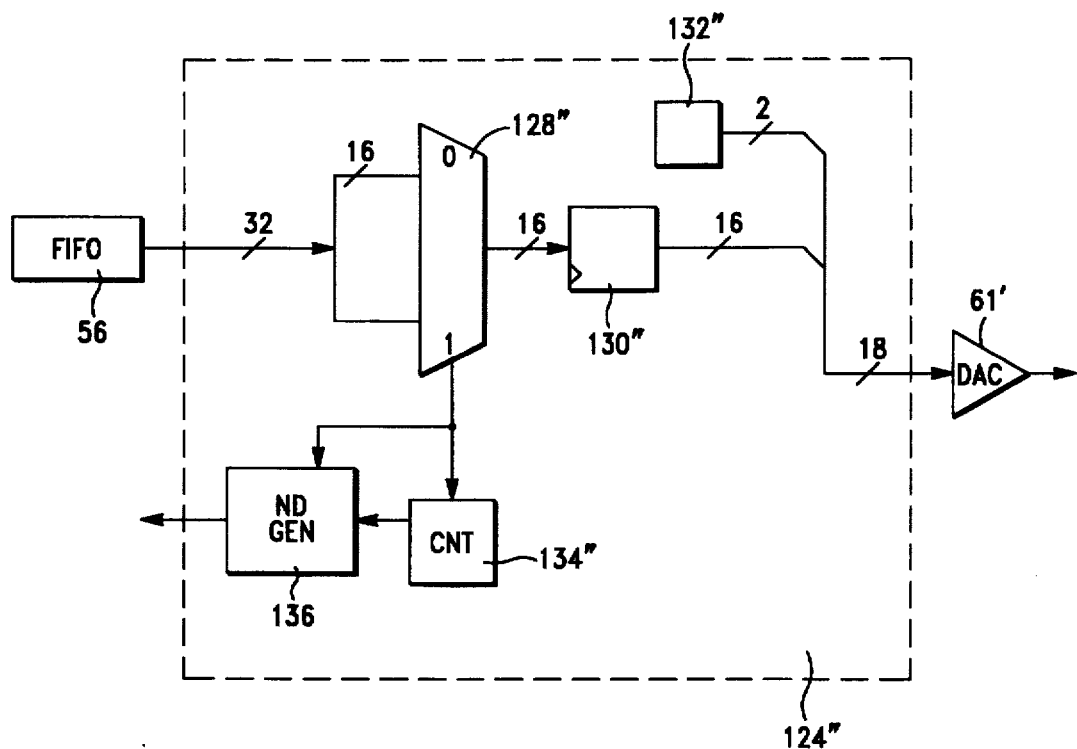

FIG. 8 provides a tabulation of a two-tiered prioritized arbitration scheme implemented for allowing access to a DRAM of the present computer system;

FIG. 9 provides two simultaneously running flow charts implemented by the SEQC of the present invention in arbitrating access to the DRAM;

FIG. 10 provides a tabulation of a three-tiered prioritized arbitration scheme implemented for allowing access to a DRAM of an alternative embodiment of the present computer system;

FIGS. 11 and 12 provide timing diagrams illustrating the result of the arbitration for access to the DRAM performed by the SEQC of the present computer system:

FIG. 13 is a functional block diagram of a conventional computer system having the ability to drive two display devices displaying differing images, and having separate processing channels for image information from a DRAM of the computer system to the display devices;

FIG. 14 provides a functional block diagram of a portion of the VDC of a computer system embodying the present invention;

FIG. 15 is a functional block diagram of a portion of the VDC represented in FIG. 14; and FIGS. 16, 17, and 18 are functional block diagrams of portions of the VDC seen in FIGS. 14 and 15.

DETAILED DESCRIPTION OF A PREFERRED EXEMPLARY EMBODIMENT OF THE INVENTION

Figure 3:
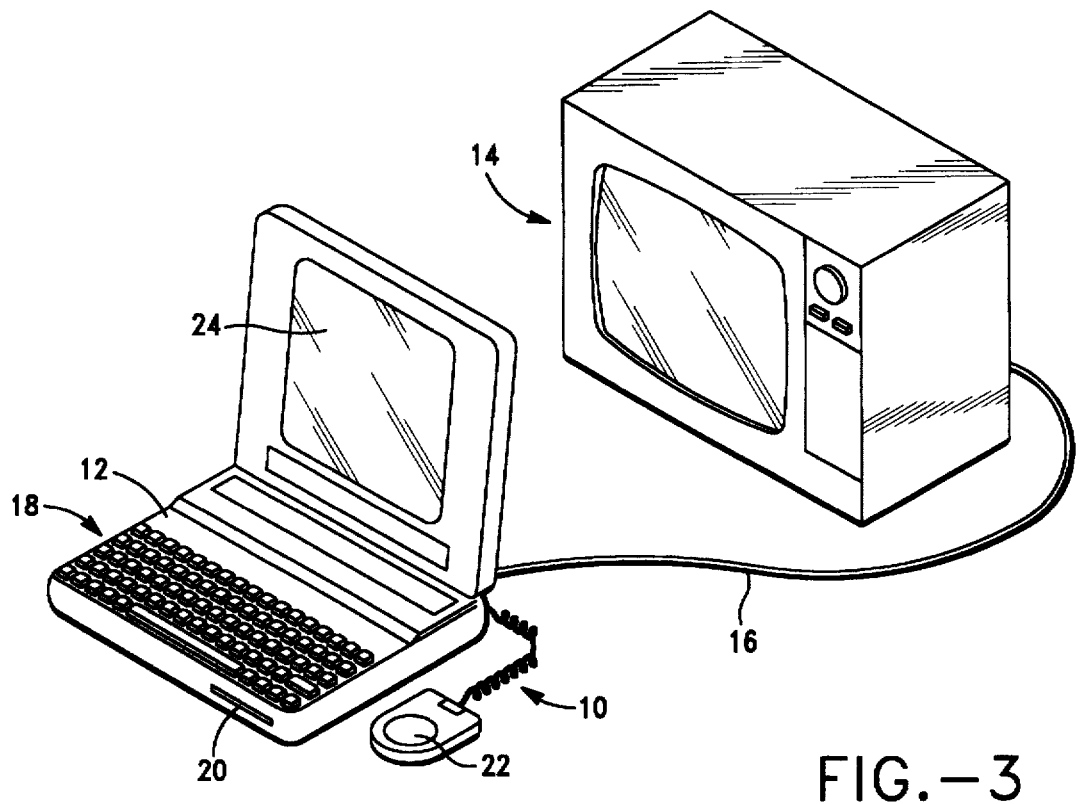

Viewing FIG. 3, a computer system 10 includes a notebook computer 12, and an additional display device 14 interfaced with the notebook computer via a cable 16. The additional display device 14 is illustrated as a conventional television. Those ordinarily skilled in the pertinent arts will recognize that the television accepts signals in NTSC format and displays an interlaced image. Alternatively, the computer system 10 may be interfaced with a conventional CRT monitor using RGB signals (and horizontal and vertical synchronization signals) and providing a non-interlaced image. The notebook computer includes various input devices, such as a keyboard 18, a floppy disk drive 20, and a track ball 22. Those ordinarily skilled in the pertinent arts will recognize that the track ball is essentially a stationary mouse input device. The computer system 10 may include additional input devices, such as a hard disk drive, a CD-ROM, and a serial input-output (I/O) port. Several of these devices also function as output devices for the computer system 10 in addition to a liquid crystal display 24. As described hereinbelow, the display 24 is presented as being of dual panel type. As depicted, the notebook computer is being used to perform a multi-task operation. For example, the notebook computer 12 may be used to conduct a financial analysis, the data for which is displayed on LCD 24, and a graphical depiction of which is displayed on CRT 14.

Figure 4:
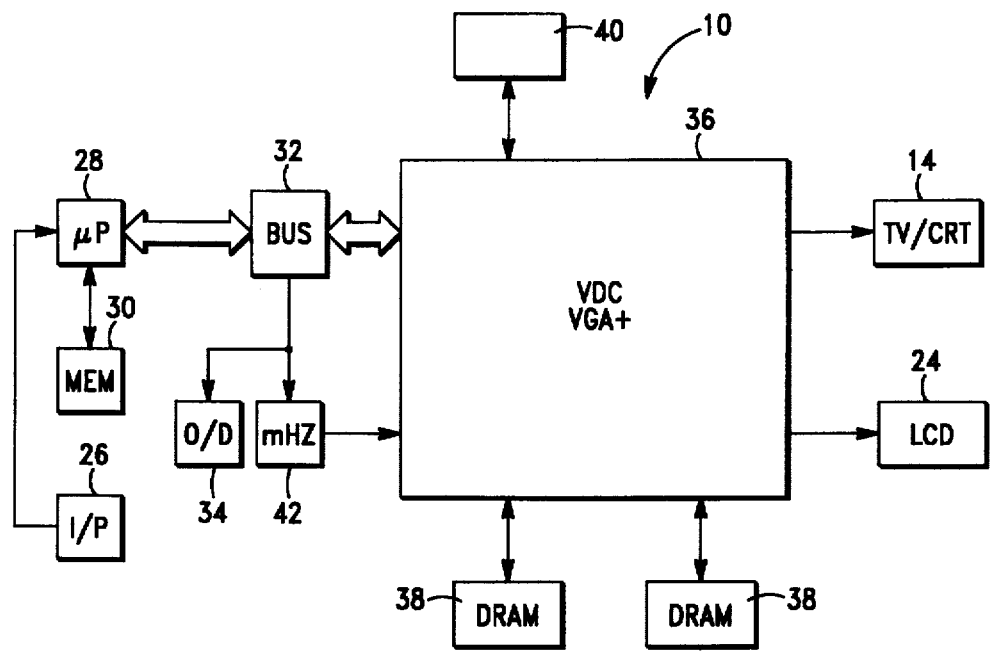

FIG. 4 provides a schematic block diagram of the computer system 10, with the input devices all subsumed within one representative block 26. The input devices are interfaced with a microprocessor 28, which also has an interface with a memory facility 30. The memory facility 30 will include the floppy disk drive 20, and may include a hard disk drive, CD-ROM, and other devices. A data bus 32 interfaces with the microprocessor 28 and provides an interface with the output devices, including the LCD and CRT image display devices 14 and 24. The other output devices for the computer system 10 are subsumed in a representative block 34. In order to facilitate the interface with the image display devices 14 and 24, the computer system 10 includes a video display controller (VDC) 36 interfacing with the bus 32, and providing driving signals for the LCD 24 and CRT 14. The VDC has an interface with dynamic random access memory (DRAM), represented on FIG. 4 with the schematic blocks 38. Also, the VDC has an interface with a power management facility 40 of the computer system 10. A dedicated clock 42 provides a reference clock rate to the VDC 36.

Figure 5:
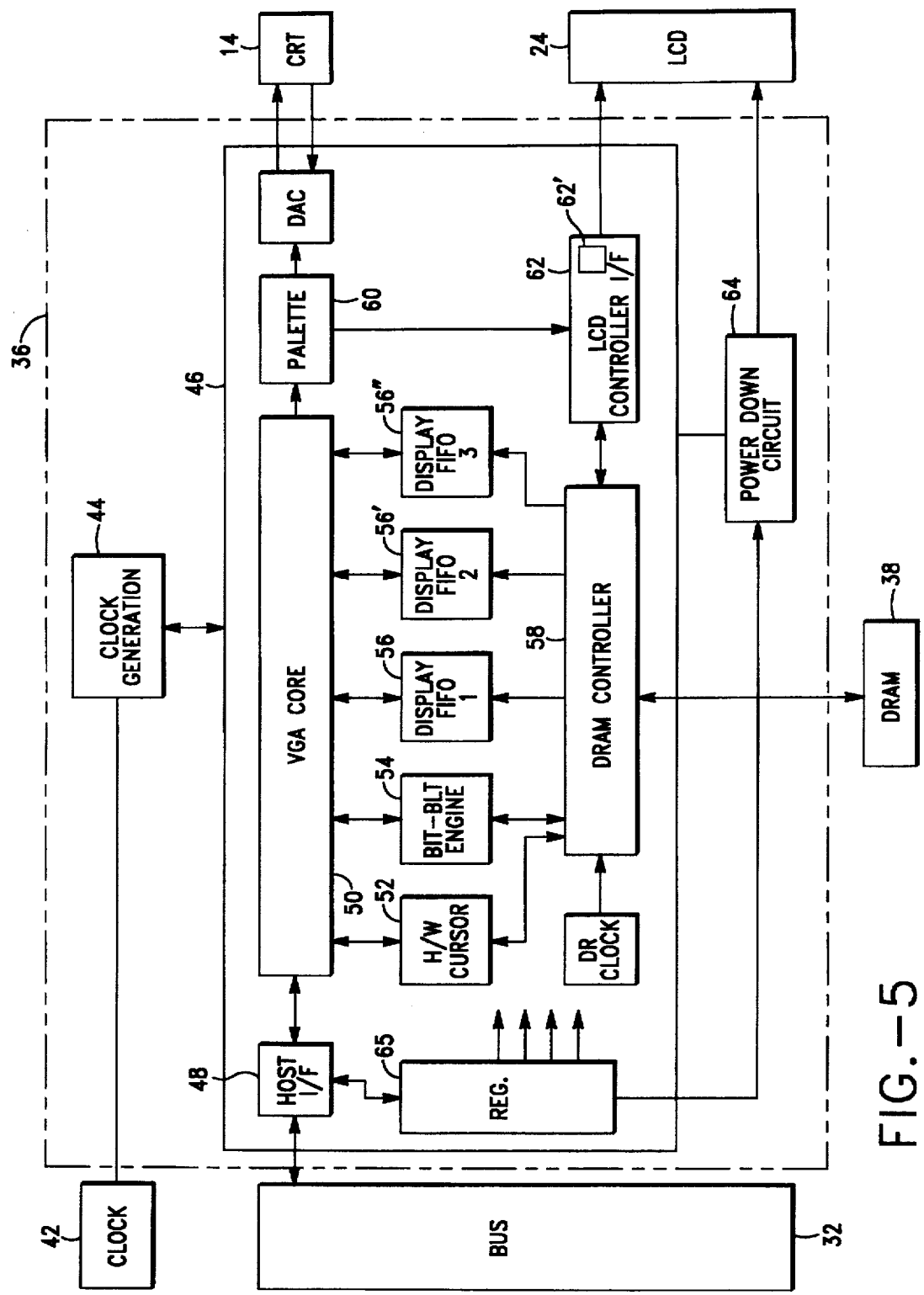

Turning now to FIG. 5, it is seen that the VDC 36 includes an internal clock 44 referenced to the clock signal from the dedicated clock 42, and providing clock signals to a video section 46 of the VDC. The clock signals provided by internal clock 44 may include a pixel clock (Pclk) and a memory clock (Mclk), the use of which will be further explained below. In order to interface the video section 46 with the bus 32, and hence with the microprocessor 28, the video section 46 includes a programmable host interface 48. The host interface 48 is programmable to configure the VDC 36 for interface with a number of conventional bus configurations. For example, host interface 48 may be configured for interface with a conventional Intel 486DX local bus, with a VL-Bus, and with a PCI interface bus. The host interface 48 interfaces the bus 32 with a VGA core portion 50 of the VDC 36. This VGA core portion 50 includes a sequencer, to be further described below, a cathode ray tube controller (CRTC), a graphics controller, an attribute controller, and conventional VGA circuitry.

In order to allow the VGA core 50 to generate and control the text, graphics and other visual characters to be displayed on the CRT and LCD (such as a cursor and icons, for example), the VGA core is interfaced with a hardware cursor generator 52, a bit-BLT engine 54, and a display FIFO 56. An additional two display FIFO's 56', and 56" are also interfaced with the VGA core 50. An alternative embodiment of the VDC 36 supporting only a single display device (either LCD or CRT) will include only a single display FIFO, and is further explained below. Another alternative embodiment supporting two display devices (one LCD and one CRT) will include two display FIFO's 56 and 56'. Of course, this embodiment will also support a single display device of LCD or CRT type. As will be explained, the embodiment including display FIFO 56 and the additional two display FIFO's 56' and 56", is employed to support the dual display operation of the computer system 10, as was explained with reference to FIG. 3, using a standard television as the second display device.

When a display device providing an interlaced image is used to display non-interlaced imagery, the image ordinarily includes a lot of flicker. However, the computer system 10 (VDC 36) includes the two additional display FIFO's 56' and 56" which are employed to store alternate lines of the non-interlaced imagery, and to sequentially supply these alternate lines of imagery to the television 24 for display as an interlaced image without flicker. Accordingly, hereinafter when the display FIFO 56 is referred to, this reference includes also display FIFO's 56' and 56". As will be further explained below, the alternative embodiment of the invention having only a single display FIFO may implement a simplified decisional scheme when deciding on allowing access to the DRAM 38.

The hardware cursor generator 52 selectively provides a cursor of increased size (i.e., twice as large as normal, for example), which is easier to visually follow as it moves across a display screen, in response to detection of a certain preselected speed of movement of the cursor provided by a software program running on microprocessor 28. Thus, when a user of the computer system 10 uses the mouse or keyboard keys to move the cursor of a program, if the speed of movement reaches the preselected threshold, then the cursor becomes doubled or larger. The bit-BLT engine, as was explained earlier, provides for block transfers of bits generated to provide graphics and other such visual characters on the CRT and LCD screens 14 and 24.

More specifically, the bit-BLT engine performs read, write, and block transfers of bits representing these characters, solid fills, destination inversions, and pattern fills. The bit-BLT performs all data alignment and masking at the boundaries of block transferred characters, as well as text expansions to accelerate the writing of monochrome images. As was explained above, the display FIFO temporarily stores bits of information, in integer multiples of double-word size units or levels, awaiting the writing of these bits to pixels of the displays 14 and 24. Preferably, the display FIFO 56 is an eight-stage FIFO, storing eight 32-bit double-words of display information for sending to the CRT and LCD 14 and 24.

Each of the hardware cursor generator 52, bit-BLT 54, and display FIFO 56 are also interfaced with a DRAM controller 58. This DRAM controller 58, as will be further explained, implements the functions of the DRAM controller/sequencer described in general terms above to arbitrate and implement requests for access to the DRAM by various functional units of the computer system 10, including other portions of the VDC 36. As is seen in FIG. 5, the DRAM controller 50 has an interface with the DRAM 38. For purposes of simplicity of illustration, the DRAM 38 is shown in FIG. 5 as a single functional block. However, those ordinarily skilled in the pertinent arts will recognize that this DRAM may comprise one or several DRAM chips. The display FIFO 56 has an interface (via the VGA controller 50 and DRAM controller 58) with both a palette controller 60, and with a liquid crystal display (LCD) interface controller 62. The palette controller 60 interfaces with a digital-to-analog converter (DAC) 61. The palette controller implements the standard 256-by-18 VGA palette, while the LCD interface controller performs frame modulation and dithering for 64 shades of grey in monochrome mode operation; and 4K colors, with dithering for a full 256K colors in color mode operation.

In order to complete this explanation of the structure represented in FIG. 4, it will be noted that the VDC 36 includes a power down controller 64. This power down controller has an interconnection with a power down register 65, which itself has a generalized interconnection within the VDC 36. This generalized interconnection of the power down register 65 is indicated on FIG. 5 with the plurality of arrows leaving the register 65. These interconnections of the power down register 65 permeate the VDC 36 and allow it to be configured for various modes of operation and for various corresponding power down modes. Also, the power down controller 64 has an interface with the LCD 24 in order to facilitate such power saving functions as LCD back light "off", and LCD display "off", under control of parameters set by the user of the computer system 10.

Figure 6:
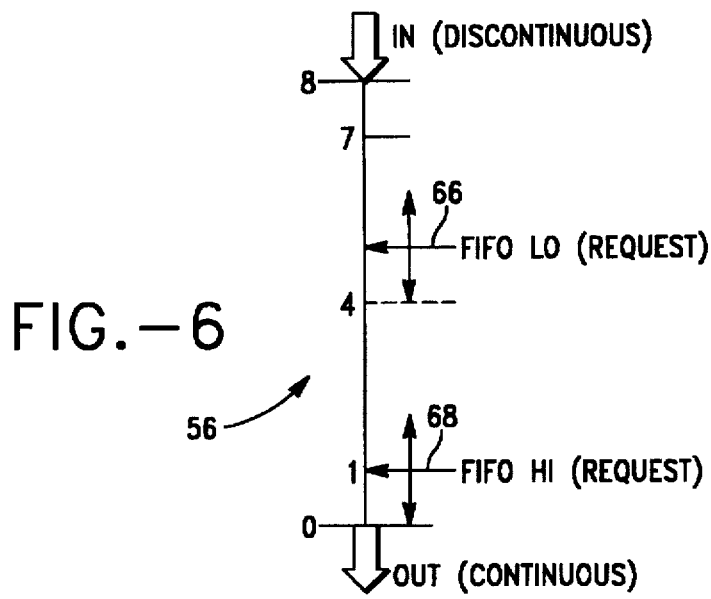
FIG. 6 is a graphical representation of a first-in-first-out display memory of the computer system seen in preceding Figures.

Turning now to FIG. 6, a simplified graphical presentation of the display FIFO 56 is presented. Preferably, this display FIFO 56 has a capacity of 8, 32-bit double-words, or levels. These levels are indicated by the numerals 1–8 along the left side of FIG. 6. Other memory capacities may be employed for a display FIFO without departing form the spirit and scope of the present invention. From the bottom of this display FIFO, while the display 14 or 24 is active, data is continuously drained to the display units at a rate which is mode dependent, as was explained above.

At the top, the display FIFO is intermittently refilled at a rate dependent upon the speed of the DRAM 38 and of the memory clock of the VDC (as well as other parameters of the computer system 10). This refilling of the display FIFO is discontinuous, and occurs according to availability of the DRAM 38, as is further explained below. Along the right side of the graphical representation of FIG. 6, are placed two movable pointers. One of these pointers (pointer 66) indicates that when the data level in the FIFO falls below this pointer, then a FIFOLO request is issued for additional data from the DRAM. This pointer 66 has a permissible position from 4 to 7. The other pointer 68 indicates the issuance of a FIFOHI request for additional data from the DRAM 38. Pointer 68 has a permissible position from 0 to 7. In each case the issuance of a FIFOLO or FIFOHI request indicates that the FIFO 56 can accept at least one additional double-word level of data.

The position of the pointer 68 along the FIFO 56 is dependent upon the mode of operation of the displays 14 and 24 (indicative of the rate of drainage of the FIFO 56), and the rate of possible filling of this FIFO (determined by the interval of the pixel and memory clocks of the VDC, the speed of the DRAM 38, and other interconnect intervals and data transfer intervals of the VDC) such that a FIFOHI request can be issued at a time as early as level 7 or as late as zero level of data in the FIFO 56 in order to insure that the FIFO does not run out of data. As pointed out above, when FIFOHI is issued, other accesses to the DRAM 38 are interrupted. Accordingly, if the display FIFO is draining slowly and the computer system can refill the FIFO quickly, the pointer 68 can be set at zero and the display will still not run out of data.

The pointer 66 is dependent for its position on the mode of display operation and on similar parameters of the computer system 10. This pointer will be set in the range from 4 to 7 in order both to facilitate early filling of the FIFO 56 with a minimal number of FIFOHI requests being issued, and to allow other devices of the computer system with best access to the DRAM 38. Understandably, the set point for the FIFOLO request (pointer 68) is not as critical as that for the FIFOHI request, and as will be seen, the level for this FIFOLO request pointer fits into a lower-tier prioritization scheme implemented by the DRAM controller 58. However, the FIFOLO request is issued at a level of the FIFO attempting to obtain sufficient access to the DRAM that a FIFOHI request will not be issued, or that the intervals between FIFOHI requests will be maximized.

As will be seen, an address state machine continuously counts new levels (double-words) of data which have entered the FIFO 56, and on the filling into the FIFO of every selected number of levels of data, a decision is made whether to remove the FIFOLO or FIFOHI requests. At no other time is a request for data from the FIFO 56 cleared. The display FIFO need not be filled completely in order to clear a FIFOLO or FIFOHI request.

Figure 7:
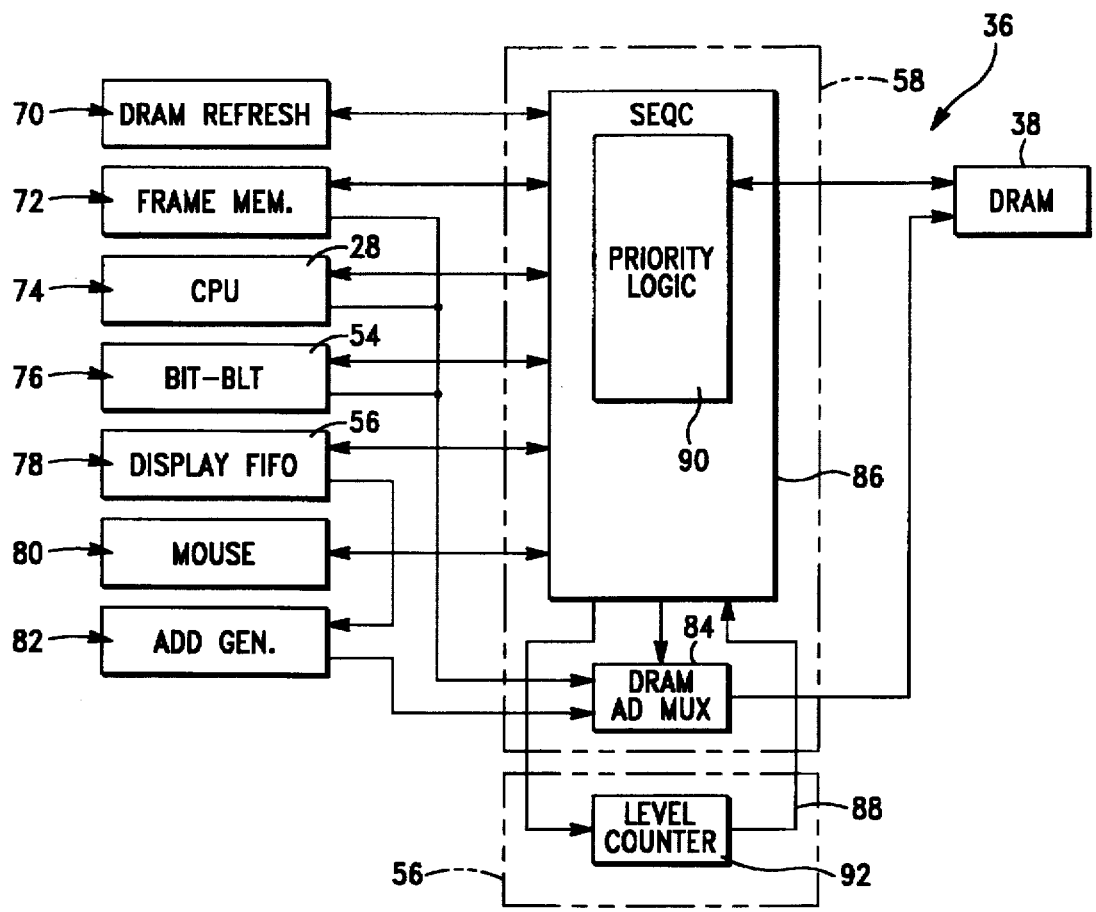
FIG. 7 is a schematic functional block diagram of a sequencer and controller (SEQC) of the present computer system.

Turning now to FIG. 7, a functional block diagram of the interconnections of the DRAM controller 58 and DRAM with the various devices of the computer system 10 is depicted. The numeral 70 within a block indicates a possible request for a DRAM refresh cycle, which request is issued on a regular repeating time interval by a clock in the VDC 38 (indicated on FIG. 5 as "Drclk"). Thus, the receipt of this request is a certainty. The time-sequencing of this request with the other requests is uncertain. Similarly, the numeral 72 within a block indicates a possible request for access to the DRAM by a half-frame buffer of the LCD controller 62 (indicated on FIG. 5 with the numeral 62'). This half-frame buffer receives and temporarily stores in the DRAM 38 pixel values which are written to the panels of the LCD 24. When the pixel values need to be refreshed, one of the panels receives fresh information from its associated display FIFO via the LCD controller 62. The other panel receives a repeat of previous pixel values which had been previously stored temporarily in the DRAM by the half-frame buffer 62'.

The panels of the LCD 24 alternate in receiving fresh image data from the display FIFO and from the half-frame buffer 62', with the half-frame buffer temporarily storing the fresh pixel values in the DRAM 38 for use in refreshing the particular panel of the display 24 while the other of the two panels is receiving fresh image data. This half-frame buffer has a limited amount of internal memory. Accordingly, during a memory access to the DRAM 38, the half-frame buffer 62' will receive enough pixel values to provide refreshing of several pixels on the display 24. The half-frame buffer issues requests for access to the DRAM on a FRAMELO (low priority), or FRAMEHI (high priority) basis dependent upon the amount of data remaining in the limited memory capacity of the half-frame buffer for use in refreshing pixels of the LCD 24.

The numeral 74 within block 28 indicates a possible request made by the CPU 28 for access to the DRAM 38. The numeral 76 within block 54 indicates a possible request for access to the DRAM38 issued by the bit-BLT engine 54, while the numeral 78 within block 56 indicates possible requests (FIFOLO or FIFOHI) issued by the display FIFO 56 seeking fresh data to be temporarily held for sending the display devices 14 or 24. As will be further explained, the FIFO requests may include a FIFOLO or FIFOHI request from and identified with each of the FIFO's 56, 56', and 56". Requests once make are continued (remain as pending) until satisfied, or until otherwise cleared in the case of the FIFOLO and FIFOHI requests.

Still viewing FIG. 7, the numeral 80 within a block indicates a possible request received from the mouse image generator circuits (i.e., introduced and explained above) for access to the DRAM 38 to draw a mouse image. The numeral 82 within a block represents an address generator servicing the display FIFO 56 (or FIFO's 56, 56', and 56") by generating addresses for use in reading data from the DRAM 38 to the display FIFO in response to a request for such data. Those ordinarily skilled in the pertinent arts will recognize that the embodiment having multiple display FIFO's 56, 56', etc., will also have a separate address generator 82 for each of these display FIFO's. A DRAM address multiplexer 84 provides the generated addresses to the DRAM 38. This address multiplexer also includes a facility for recognizing when generated addresses require a page break in the DRAM 38, and provides a page break signal (indicated with numbered arrow 88) to the SEQC 86 which is used in initiating the pre-charge sequence necessary in the DRAM 38 in order to allow a different page of this memory to be accessed. This page break signal is indicated when new data has a different row address from the last previous data input into the DRAM 38. In the event that the new data has the same row address, a page break signal is not issued, and page mode operation of the DRAM is maintained with no lost time for a pre-charge sequence even when the last previous data and the new data are from different devices of the computer 10. That is, a change of device accessing the DRAM 38 does not necessarily cause a page break in the DRAM 38.

Within SEQC 86 is a priority logic unit 90 implementing a logical selection process among the pending requests for access to the DRAM 38, as is illustrated in FIGS. 8 and 10.

FIG. 8 represents the simpler alternative of a DRAM controller having only a single display FIFO 56, and will be considered first. Viewing FIG. 8, it is seen that the pending requests for access to the DRAM 38 are first of all assigned to one of two tiers (an upper tier and a lower tier), as will be further explained. Within the upper tier, pending requests are ranked in order of priority (numbered 1u through 5u). Similarly, within the lower tier, pending requests are ranked in order of priority (indicated as 1l through 3l). Within this logical structure of ranked pending requests for access to the DRAM 38, each upper-tier request may interrupt any existing access to the DRAM 38 granted in response to another upper-tier request with a lower rank, and may also interrupt an access granted in response to all lower-tier requests. Thus, if an access to the DRAM for the display FIFO is underway in response to a FIFOLO request (ranked 1l), and a request to refresh the DRAM is received by the SEQC (ranked 4u), then the display FIFO access is interrupted. The DRAM is then refreshed.

However, if during this refreshing of the DRAM, a CPU request for access to the DRAM is received (ranked 5u), the CPU will have to wait for access to the DRAM because the SEQC will not allow an interrupt for a lower ranked request even in the upper tier. On the other hand, if a FIFOHI request (ranked 2u) is received during a refresh of the DRAM 38, then this request will be honored by an interruption of the DRAM refresh and granting of access to the DRAM by the display FIFO for receiving new data for display. Within the lower tier of requests, no interrupts of existing accesses to the DRAM 38 are allowed. These lower-tier requests are simply allowed access to the DRAM in order of priority and may be interrupted by any upper-tier request. That is, an access to the DRAM 38 granted in response to a bit-BLT request (ranked 3l) will not be interrupted by any other lower-tier request, but may be interrupted by any upper-tier request.

Further to the above, FIG. 9 graphically depicts an additional function performed by the DRAM controller 58 by use of a level counter 92 (seen in FIG. 7), recalling that display FIFO 56 and DRAM controller 58 are both within the VDC 36 and are interfaced with one another. The level counter 92 continuously monitors addresses generated for accessing data within DRAM 38, and which are used in writing this data to the display FIFO 56. Every Nth level of data ("N" representing a selected integer multiple of levels of data provided to the display FIFO 56), the level counter 92 resets a flag or register in the SEQC 86. As FIG. 9 illustrates, the DRAM controller 58 simultaneously and independently tests the result of two separate questions. One question is whether the level of data in display FIFO 56 is below the FIFOLO pointer. IF the answer is "no", the question is continued. If the answer is "yes", then the FIFOLO request is issued. Every Nth level of data written to the display FIFO 56 (as indicated by the reset flag or register explained above), the question is ask again, and if the answer is "no", the FIFOLO request is cleared. Thus, FIFOLO may be cleared without the display FIFO being completely filled with data.

Similarly the other question is whether the level of data in display FIFO 56 is below the FIFOHI pointer. IF the answer is "no", the question is continued. If the answer to this question is "yes", then the FIFOHI request is issued. As pointed out above, FIFOHI (ranked 2u, recalling FIG. 8) will effect an interrupt of all other requests for access to the DRAM 38, except for the mouse request (ranked 1u). Thus, the issuance of FIFOHI will in a very short time result in data being accessed in DRAM 38 and written into the display FIFO 56. Every Nth level of data written to the display FIFO 56 (as indicated by the reset flag or register explained above), the question is ask again, and if the answer is "no", the FIFOHI request is cleared. Thus, FIFOHI may also be cleared without the display FIFO being completely filled or even filled to the level of the FIFOLO pointer. The display FIFO 56 need only be filled to a level above the FIFOHI pointer at the completion of writing N levels of data into the display FIFO.

Preferably, the value of "N" is selected to be four (4). This value for N is convenient with a display FIFO having eight levels as described, and with these levels each being 32 bits. In some VGA modes of operation, each pixel takes 4 bits, and the frame buffer refreshes the LCD display every 32 pixels, so there is a beneficial correlation in these modes of operation between the sequencing of frame refreshes, and the writing of N levels of data to the display FIFO. Of course, the display FIFO need not be eight levels deep, and N need not be selected to be four. N will be selected in view of the interplay between the size of the display FIFO and the speed at which data can be accessed (DRAM speed) and written to this display FIFO, as well as the rate at which the display FIFO is depleted of data, and the requirements for other devices of a particular system to access the DRAM.

Considering now FIG. 10, the priority logic scheme implemented by the priority logic unit 90 in the more complex alternative of a DRAM controller having two or more display FIFO's 56, 56', 56", etc., is presented graphically. Viewing FIG. 10, it is seen that the pending requests for access to the DRAM 38 are first of all assigned to one of three tiers (an upper tier, a middle tier, and a lower tier), as will be further explained. Within the upper tier, pending requests are ranked in order of priority (numbered 1u through 3u). It will be noted that this tier has several co-equal requests at one ranking level, as will be explained further. Within the middle tier, requests are ranked from 1m to 2m. Similarly, within the lower tier, pending requests are ranked in order of priority from 1l through 3l. Within this logical structure of ranked pending requests for access to the DRAM 38, each upper-tier request is placed in a queue of requests in that tier.

These requests for access to the DRAM 38 are honored in order of their position in the queue. The upper tier requests may not interrupt any existing access to the DRAM 38 granted in response to another upper-tier request. It will be noted that these upper-tier requests 1u–3u include a rank (2u) containing several co-equal requests. That is, the upper-tier rank 2u includes plural FIFOHI$_n$ requests, in which the subscript "n" indicates the one of several FIFO's $56_{1-n}$ making the request. Viewing FIG. 5, it will be seen that the FIFO's 56, 56', and 56" each carry a numerical identifier 1–3, with this identifier being used to indicate the source of a FIFO access request in FIG. 10. On the other hand, an upper tier request may interrupt any existing access to the DRAM granted in response to any middle-tier or lower-tier request. A middle-tier request may not interrupt any upper-tier access, and may only interrupt any DRAM access granted in response to a middle-tier request with a lower rank, or any access granted in response to a lower-tier request. The lower-tier requests are not able to interrupt any other access to the DRAM, and are placed in a respective queue for service. It will be noted that these lower-tier requests also include a rank (1l) containing several co-equal requests. That is, the lower-tier rank 1l includes plural FIFOLO$_n$ requests, in which the subscript "n" similarly indicates the one of several FIFO's $56_{n-1}$ making the request.

FIGS. 11 and 12 present timing diagrams illustrating (by way of example only) a result of the two-tiered arbitration for access to the DRAM performed by the SEQC of the present computer system. A similar result can be expected with a three tiered arbitration scheme as presented in FIG. 10. Viewing first FIG. 11, it is seen that in interval #1, the bit-BLT has made a request for access to the DRAM, and that this request is granted. At the beginning of interval #2, the display FIFO has made a request for access to the DRAM. The fact that both FIFOLO and FIFOHI are issued simultaneously indicates that the display FIFO is empty of display data. In interval #2, the display FIFO supersedes the bit-BLT request (recalling the priority scheme of FIG. 8), and receives sufficient display data to result in the FIFOHI request being canceled (recalling the test conducted by the flow chart of FIG. 9). In interval #3, the display FIFO is still serviced by the DRAM because a FIFOLO request (still pending) has a higher priority than the pending bit-BLT request.

In interval #4, the FIFOLO request is canceled (not an indication of a full FIFO, but of a FIFO level above the FIFOLO pointer), and the bit-BLT request is honored. At the beginning of interval #5, the FIFOLO request is issued, but the bit-BLT engine retains access to the DRAM because lower-tier requests cannot interrupt one another (recalling FIG. 8). At interval #6, FIFOHI is issued, and interrupts the access of the bit-BLT. Interval #7 indicates that FIFOHI has been canceled, but that the display FIFO retains access to the DRAM, again because the pending bit-BLT request is also a lower-tier request and cannot interrupt the still-pending FIFOLO request. Interval #8 indicates that when FIFOLO is canceled, then the pending bit-BLT request is honored.

FIG. 12 presents a similar arbitration episode, this time with the SEQC arbitrating between the CPU and the display FIFO. Viewing FIG. 12, interval #1 indicates a CPU request for access to the DRAM. This request is granted and the CPU signs off. In interval #2, the DRAM is idle, but interval #3 indicates that the display FIFO has made a request for access to the DRAM. Again, the fact that both FIFOLO and FIFOHI are issued simultaneously indicates that the display FIFO is empty of display data. In interval #3, the display FIFO supersedes the CPU request (recalling the priority scheme of FIG. 8), and receives sufficient display data to result in the FIFOHI request being canceled (again recalling the test conducted by the flow chart of FIG. 9).

In interval #4, the CPU is allowed access to the DRAM because an upper-tier request can interrupt an access granted for any lower-tier request (FIFOLO being a lower-tier request). In interval #5, the CPU has signed off the DRAM, and the FIFOLO request is honored. Interval #6 indicates that the CPU has made a request for access to the DRAM, which interrupts the display FIFO access because only FIFOLO is pending. When the CPU signs off the DRAM (interval #7) the DRAM access is returned to the display FIFO. At the beginning of interval #8, the FIFOHI request is issued and is honored, however this interval #8 includes the issuance of a CPU request for access to the DRAM which is not honored because the CPU cannot interrupt a higher-ranked upper-tier request. Interval #9 indicates the clearing of FIFOHI, and the granting of access to the CPU, because the CPU can interrupt the display FIFO request based on the pending FIFOLO request.

Having considered the SEQC 86 and operation of the display FIFO 56, attention may now be directed to the architecture of the VDC 36 which allows it to provide driving signals to a double display devices. As was explained above, the double display devices may include one or two CRT's, one or two LCD's, or a mixture of a CRT and an LCD, each of which will show differing display imagery. Alternatively, a conventional television may be substituted for the CRT, as was explained above with respect to display FIFO's 56' and 56", which will handle the interlacing chore for providing an NTSC format signal to the television. Considering now FIG. 13, a conventional architecture for a computer system 94 is shown. This conventional architecture includes a DRAM 96 within which a virtual memory desk top space 98 is defined. Within the desk top space 98 are defined two display memory spaces 100 and 102, one marked with the #1, and other marked with the #2, to indicate to which one of the two displays the respective memory space is allocated. Within the desk top memory space 98 the two memory spaces 100 and 102 may be moved around and selectively positioned by a user of the computer system 94. The memory spaces 100 and 102 are selectively positioned on the desk top 98 by the user specifying the location of a reference corner 104, and 106, respectively, of each memory space. The user also needs to specify the size of each display—with the memory space having the same virtual size as the associated display.

The virtual desk top is large enough that the user can relatively position the memory spaces 100 and 102 one above the other, or side-by-side, for example. As so positioned, if the user places the near edges of the memory spaces 100 and 102 next to one another, then imagery may extend from one display screen to the other without a break, and a cursor may be moved across the memory space 98, leaving one display to appear immediately in the other display, for example. However, if one considers how the conventional architecture achieves this double display function, it is seen that the computer system includes a sequencer 108 allowing accesses to the DRAM 96, and feeding display data to a pair of dedicated display processing channels, or pipelines, generally referenced with the numerals 110 and 112. Conventionally, each of these display pipelines would include a respective display FIFO 114, and a respective display processor 116, each feeding display driving signals to the respective one of the two displays, each referenced with the numeral 118.

As can be readily seen, this conventional architecture for a computer system requires the duplication of a considerable number of circuits and components of the computer system. For example, in the past it has been conventional to operate a computer system with double displays and having a separate video controller card (monochrome or color) dedicated to the particular display device driven by the particular card. Thus, it is seen that changing the configuration of the computer system is not easily accomplished. Further, were the computer system to be of the notebook or portable configuration having a single display (usually of the LCD flat-panel type), it is not easily accomplished to interface the computer system with what ever type of CRT, monitor, or television set which happens to be available at a particular location in order to use the double display capability of the computer system.

Turning now to FIG. 14, another portion of the internal architecture of the VDC is depicted along with its interconnection to related devices of the computer system 10. In order to obtain reference numerals for use in describing the structure seen in FIGS. 14 through 18, structure which is the same as, or which is equivalent in structure or function to, structure described above is referenced with the same numeral used above, and having a prime (') added thereto if such is necessary to avoid confusion. In this instance, the two display devices are referenced with the numerals 14/24, and 14/24' to indicate that each of the display devices may be either a CRT or an LCD. The configuration of computer system seen in FIG. 14 is not intended to drive a conventional television as a substitute for one of the CRT's. However, as was explained above, the SEQC may include three (rather than only two) display FIFO's 56 (i.e., 56' and 56") so that an interlaced image signal can be provided to a conventional television. Further, duplicated components are referenced with the same numeral used above, and having one or more primes added thereto. Accordingly, those ordinarily skilled in the pertinent arts will appreciate that the architecture described with reference to FIG. 14 may be expanded by another increment in order to drive a conventional television.

Considering FIG. 14, it is seen that the VDC 36 includes a pair of display FIFO's (referenced with numerals 56, and 56') each having an associated display FIFO counter 92, 92', and an associated address generator 82, 82'. For simplicity of illustration, the host interface 48 is depicted in FIG. 14 as merely a dotted line boundary. Within the DRAM 38 is created a virtual desk top, like that explained above with reference to FIG. 13. The virtual desk top includes separate memory spaces 100', and 102' each allocated to one of the two display devices 14/24. As was explained above with respect to the SEQC 86 of the DRAM controller 58, this SEQC arbitrates requests for access to the DRAM 38, including accesses to the virtual desk top, and memory spaces 100', 102'. Display FIFO 56 accesses display data from memory space 100' and delivers this data to a display data processing pipeline (hereinafter, "the pipeline", or just "pipeline"), generally indicated with the numeral 120, for sending to the associated display device 14/24. Those ordinarily skilled in the pertinent arts will recognize that the pipeline 120 is not a pipe, but is a complex display data processing circuit (DDPC), as is further explained below. Similarly, display FIFO 56' accesses display data from the memory space 102' for sending to associated display device 14/24' via the same processing pipeline 120.

The processing pipeline (DDPC) 120 accepts the display data provided from the particular one of the display FIFO's 56, and 56', and provides signals driving the associated display 14/24, and 14/24'. As mentioned above, because the VDC has more than one display FIFO, the SEQC 86 will employ the three tiered priority scheme explained above to arbitrate accesses to the DRAM 38. However, the display FIFO's 56 and 56' will be allowed sufficient access to the DRAM 38 that the FIFO's do not run out of display data originating with the particular memory spaces 100' and 102'. Accordingly, although the accesses to the DRAM 38 are intermittent for each of the display FIFO's 56 and 56', the displays 14/24 and 14/24' will each be supplied simultaneously with different display data. That is, the user of the computer system 10 will see a different image presented on the displays 14 and 24 simultaneously. In order to control part of the variable configuring of display pipeline 120 to operate with various CRT's, the VDC 36 includes a cathode ray tube counter (CRTCNTR) 122. Dependent upon the capabilities of the particular CRT's interfaced with the computer system 10, the CRTCNTR 122 may be able to read the number of lines of resolution which the monitor can provide. In other cases in which monitors not having a communication bus over which this data can be read are interfaced with the computer 10, the user will have to enter this information.

FIG. 15 provides a high level functional block diagram of the display processing pipeline (DDPC) 120. Even though this display processing pipeline appears to present two separate processing channels, each serving one of the display FIFO's 56 or 56', the processing channels are defined in functionally cooperating elements of a complex and variably-configurable circuit. That is, the processing pipeline 120 is variably configurable to match the processing requirements of the mode of operation and type of display devices interfaced with it. In general terms, the display pipeline 120 provides at least a pair of dedicated and variably configurable data decode and over scan site (DDOS) 124 or 124' for each of the display FIFO's 56 and 56', respectively.

As was explained above with respect to the operation of the display FIFO's 56, the display data is provided in units of 32-bit double-words. Each DDOS 124 accepts 32-bit double-words of data and manipulates this data into a form recognizable and acceptable to the particular type of display device 14/24 which is displaying the image from each associated memory space 100' or 102', as will be further explained. For example, in the event that one of the display devices 14/24 is being operated in 16 color mode, then each pixel requires 4 bits of data from the display memory space 100' or 102' of DRAM 38. In this case, each 32-bit double-word of data will convey 8 pixel values, each having 4-bits. On the other hand, if the display is being operated in 256-color mode, then each pixel requires 8 bits of display data. In this case, each 32-bit double-word of data will convey 4 pixel values, each of 8 bits. Alternatively, in 64K color mode, each pixel requires 18 bits (16, plus 2), and the 32-bit double words can convey two pixel values, each having 16 bits. The addition of the extra two bits for each pixel will be described below.

Each DDOS 124, or 124' feeds pixel values to a respective flip flop 126, or 126', respectively feeding a LCD interface 62 if the display device is an LCD 14, or a DAC 61 if the display device is a CRT. FIG. 16 illustrates one of the possible alternative variable configurations for a DDOS 124 within the pipeline 120. In this configuration, the double-words of data are entered into respective locations (numbered 0–7 on FIG. 16) of a 8-channel de-multiplexer 128. From the demux 128, the bits are taken four at a time via a flip flop so that they appear as the four least-significant bits of an 8-bit word. The remaining four bits (i.e., the most significant bits) are added by a register 132, all as zero values. This is the required bit-word format for the 16-color mode of display operation. The display device is operated in 16-color mode. Accordingly, the DDOS provides 8-bit words of display data to a LCD interface 62', as explained above. A counter 134 tracks the input versus the output of the demux 128, and provides a signal to a request generator 136 when an additional 32-bit word of display data can be provide from the associated display FIFO 56 or 56'.

FIG. 17 provides an illustration of an alternative variable configuration for a DDOS 124' of the pipeline 120. In this case, a display device is operated in 256-color mode. The demux 128' is of 4-channel configuration. Consequently, the bit values are taken eight at a time via the flip flop 130' to a display device. Again, the LCD interface 62' accepts 8-bit words of display data, this time providing 256 color mode operation.

Finally, FIG. 18 provides a functional block diagram of yet another alternative variable configuration for a DDOS 124" within the pipeline 120. In this case, the display data from a display FIFO 56 or 56' is to be decoded into a 64K color mode image. Accordingly, eighteen bits are required for each pixel value. The sixteen least significant bits are obtained from corresponding locations of a two-channel demux 128'. A register 132" provides the needed additional most significant bits for each display data word. The 18-bit display data words are provided to a DAC 61', and hence to a CRT.

In view of the above, those ordinarily skilled in the pertinent arts will recognize that the DDOS 124, 124' and 124" share many similarities. The number of channels being employed in the demux 128, 128' and 128" being a most significant difference in these DDOS configurations. Corresponding count values are used in each counter 134, 134' and 134" according to the number of channels being used in the demux's 128. Accordingly, it is seen that the configuration of the internal DDOS's of the display pipeline 120 is responsive to the mode of operation of the particular display device, as well as the type of display device to vary in configuration particulars while keeping the same general configuration in general as is seen in FIGS. 16 through 18. In this way, a single variably-configurable display processing pipeline may be employed with far greater flexibility and lower cost than is necessitated by the dedicated display pipeline circuit configurations described above and illustrated in FIG. 13.

Of course it will be obvious to those of ordinary skill in the relevant art, after study of the description set forth above in conjunction with the drawings, that principles, features and methods of operation of the described computer system with double simultaneous displays showing differing display images and methods may be readily applied to other systems and devices, including but not limited to intelligent devices incorporating a display, embedded micro-controllers incorporating a user display, and intelligent input/output processing mechanisms including a display.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. A system comprising:
   an input device for receiving inputs from a user of said system;
   a central processing unit (CPU) interfacing with said input device and responding to said inputs by performing a processing function producing an output including display data;
   an output device receiving said output response from said CPU and providing a sensible output response;
   said output device including at least a pair of display devices each providing a different visible image to the user in response to said display data;
   a video display controller (VDC) including a display data processing circuit (DDPC);
   a dynamic random access memory (DRAM) interfacing with said CPU via said VDC and receiving said display data for temporary storage;
   said VDC including at least a pair of display first-in first-out (FIFO) memories interfacing with said DRAM for receiving and temporarily holding display data to be imminently presented on a corresponding one of said at least a pair of display devices, said at least a pair of display FIFO's also interfacing with said DDPC to provide thereto corresponding data destined for each particular one of said at least a pair of display devices, said DDPC including plural display data decode and over scan (DDOS) portions each corresponding to one of said at least a pair of display FIFO's and receiving said display data therefrom, each of said plural DDOS portions providing a corresponding demultiplexer circuit receiving said display data in a first bit-word format and responsively providing a data bit stream in a selected second bit-word format to a corresponding one of said at least a pair of display devices; a counter for counting a number of words in said second bit-word format that have been demultiplexed from each word in said first bit-word format, and means for generating a data request signal when all words of data in said second bit-word format have been demultiplexed from a word in said first bit-word format.

2. A video display system, comprising:
   first and second video display means;
   memory means for storing first and second video data corresponding to first and second images for display on the first and second video display means respectively, the first and second video data being in a first format;
   processor means for reading the first and second video data out of the memory means; and
   first and second convertor means which are configured to convert the first and second video data from the first format into first and second display data in second and third formats respectively, the first and second converter means applying the first and second display data to the first and second video display means respectively and wherein
   the first converter means comprises a demultiplexer for sequentially demultiplexing words of the first display data from each word of the first video data, and
   the first converter means further comprises a counter for counting a number of words of the first display data that are demultiplexed from each word of the first video data, and means for generating a data request signal when all words of the first display data have been demultiplexed from a word of the first video data.

3. A system as in claim 2, in which the second and third formats are identical.

4. A system as in claim 2, in which the second and third formats are different.

5. A system as in claim 2, in which:
   the first format has a word length of a first number of bits; and
   the second format has a word length of a second number of bits that is smaller than the first number of bits.

6. A system as in claim 5, in which:
   the first number is at least twice as large as the second number; means for generating a data request signal when all words of the first display data have been demultiplexed from a word of first video data.

7. A system as in claim 2, in which the first converter means comprises adding means for adding predetermined most significant bits to each word of first display data.

8. A system as in claim 7, in which the adding means comprises a register for storing said most significant bits.

9. A system as in claim 5, in which the first number is an integral multiple of the second number.

10. A system as in claim 2, in which the first and second converter means each comprise a variably configurable data decode and over scan site (DDOS) means.

11. A system as in claim 2, in which the first and second converter means comprise first and second memories for temporarily storing the first and second video data respectively.

12. A system as in claim 11, in which the first and second memories are first-in-first-out (FIFO).

13. A configurable video data converter for converting video data in a video format into display data in a display format, with the video format having a word length of a first number of bits, and the display format having a word length of a second number of bits which is smaller than the first number of bits, comprising:

a demultiplexer for sequentially demultiplexing words of the display data from each word of the video data;

a counter for counting a number of words of the display data that are demultiplexed from each word of the video data; and means for generating a data request signal when all words of display data have been demultiplexed from a word of video data.

14. A converter as in claim 13, further comprising adding means for adding predetermined most significant bits to each word of display data.

15. A converter as in claim 14, in which the adding means comprises a register for storing said most significant bits.

16. A converter as in claim 13, in which the first number is an integral multiple of the second number.

17. A converter as in claim 13, comprising a variably configurable data decode and over scan site (DDOS) means.

18. A converter as in claim 13, further comprising a memory for temporarily storing the video data.

19. A converter as in claim 18, in which the memory is first-in-first-out (FIFO).

20. A method for displaying video data, comprising the steps of:

(a) providing first and second video display means;

(b) storing first and second video data corresponding to first and second images for display on the first and second video display means respectively in a memory means, the first and second video data being in a first format;

(c) reading the first and second video data out of the memory means;

(d) converting the first and second video data from the first format into first and second display data in second and third formats respectively; and (e) applying the first and second display data to the first and second video display means respectively; and wherein step (d) comprises sequentially demultiplexing words of the first display data from each word of the first video data; and step (d) comprises the substeps of:

(d1) counting a number of words of the first display data that are demultiplexed from each word of the first video data, (d2) generating a data request signal when all words of the first display data have been demultiplexed from a word of first video data.

21. A method as in claim 20, in which the second and third formats are identical.

22. A method as in claim 20, in which the second and third formats are different.

23. A method as in claim 20, in which:

the first format has a word length of a first number of bits; and the second format has a word length of a second number of bits that is smaller than the first number of bits.

24. A method as in claim 23, in which:

the first number is at least twice as large as the second number;

(d2) generating a data request signal when all words of the first display data have been demultiplexed from a word of first video data.

25. A method as in claim 20, in which step (d) further comprises adding predetermined most significant bits to each word of first display data.

26. A method as in claim 25, in which step (d) further comprises storing said most significant bits in a register.

27. A method as in claim 23, in which the first number is an integral multiple of the second number.

* * * * *

UNITED STATES PATENT AND TRADEMARK OFFICE
CERTIFICATE OF CORRECTION

PATENT NO.    : 5,694,141
DATED         : December 02, 1997
INVENTOR(S)   : Lawrence Chee It is certified that errors appear in the above identified patent and that said Letters Patent is hereby corrected as shown below:

Column 20, line 14, change ";" to --,--.

line 56, change ";" to --.-- and delete "means for generating a data request signal when all words of the first display data have been demultiplexed from a word of first video data.".

Column 22, line 29, change ";" to --.--.

line 30, delete "(d2) generating a data request signal when all words of the first display data have been demultiplexed from a word of first video data.".

Signed and Sealed this

Seventh Day of April, 1998

Attest:

BRUCE LEHMAN

*Attesting Officer*    *Commissioner of Patents and Trademarks*